United States Patent Office 3,649,654
Patented Mar. 14, 1972

3,649,654
WATER-SOLUBLE CATIONIC NAPHTHOQUINONE-IMINE DYESTUFFS CONTAINING A QUATERNARY AMMONIUM GROUP
Heinz Keller, Muttenz, and Hans Grossmann, Oberwil, Switzerland, assignors to Durand & Huguenin A.G., Basel, Switzerland
No Drawing. Continuation-in-part of application Ser. No. 698,119, Jan. 16, 1968. This application Dec. 12, 1968, Ser. No. 783,429
Claims priority, application Switzerland, Jan. 16, 1967, 580/67
Int. Cl. C07c 97/10
U.S. Cl. 260—396 N    4 Claims

ABSTRACT OF THE DISCLOSURE

Condensation products of a primary phenylamine which contains a quaternary ammonium group, and a compound of the formula

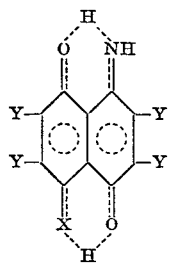

in which
X is an oxygen atom or the NH group, and
Y is a hydrogen atom, a chlorine atom, a bromine atom or a lower alkyl group, are suitable for dyeing animal and human hair, and particularly for dyeing living human hair.

---

This application is a continuation-in-part of copending application, Ser. No. 698,119, filed Jan. 16, 1968, now abandoned.

The present invention relates to novel, water-soluble cationic naphthoquinoneimine dyestuffs and to the use thereof for dyeing hair, especially living human hair.

The cationic naphthoquinoneimine dyestuffs of this invention are prepared by the condensation of a primary arylamine which contains a quaternary ammonium group, with a compound of the formula

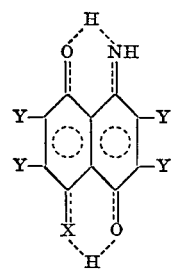

wherein
X is an oxygen atom or the —NH— group, and
Y is hydrogen atom, a chlorine atom, a bromine atom or lower alkyl group with 1 to 4 carbon atoms (e.g. methyl, ethyl, n-propyl, isopropyl, n-butyl, etc.).

The method used for writing the Formula I is to be understood to include all mesomeric limiting forms and the question of the actual bonding conditions and the distribution of electrons is left open. In the interest of clear and simple representation each bond in the formulae given below in the examples is shown as a single solid line irrespective of its character. In all cases, however, the naphthalene structure is to be interpreted as monoquinoid.

The condensation of the compound of Formula I with an arylamine as previously defined can be carried in per se conventional manner, for example at 40–150° C. and in the presence of a suitable solvent, such as ethanol, isopropanol, dimethylformamide, water and more especially glacial acetic acid. A condensation accelerator, such as boric acid, copper or sodium acetate, may optionally be employed. Depending upon the reactants in the condensation, the stoichiometric relationship and the reaction conditions, mono-, di- and tricondensation products result. It is advantageous to select condensation conditions so that monocondensation products are predominantly formed. The arylamine residue can, according to the invention, enter into the alpha-position of the naphthoquinoneimine with splitting off of ammonia and/or in the beta-position with splitting off of hydrogen halide. It is also possible that hydrolysis of an amino group of the compound of Formula I may take place concurrently with the condensation.

The course of the reaction is generally not unitary, so that mixtures of different dyestuffs of Formula I are obtained.

The precise chemical constitution of the reaction products is rarely known. In the examples, infra, the dyestuffs according to the invention are therefore defined by the process of preparation thereof. For the sake of clarity, however, the probable structural formulae are given.

Suitable compounds of Formula I for preparing the dyestuffs of the invention are for example 5-amino-8-hydroxy-1,4-naphthoquinone-1-imine,
3,7-dichloro-5-amino-8-hydroxy-1,4-naphthoquinone-1-imine,
3-bromo-5-amino-8-hydroxy-1,4-naphthoquinone-1-imine,
3,7-dibromo-5-amino-8-hydroxy-1,4-naphthoquinone-1-imine,
2,3,7-tribromo-5-amino-8-hydroxy-1,4-naphthoquinone-1-imine,
2,3,6,7-tetrabromo-5-amino-8-hydroxy-1,4-naphthoquinone-1-imine,
2,6-dimethyl-3,7-dibromo-5-amino-8-hydroxy-1,4-naphthoquinone-1-imine and
3,7-dibromo-5,8-dihydroxy-1,4-naphthoquinone-1-imine.

The primary arylamines with a quaternary ammonium group are most advantageously derivatives of aniline. The arylamine can contain substituents that are conventional in dyestuff chemistry, for example Cl, Br, lower alkyl, lower alkoxy, etc. (the term "lower" connotes the presence of about 1 to 4 carbon atoms). The quaternary ammonium group desirably is one wherein the central nitrogen atom is connected not only to the arylamine residue but is also connected to lower hydrocarbon groups, for example methyl, ethyl, propyl, etc. The lower hydrocarbon groups can in some cases form, together with the nitrogen atom, a monocyclic radical, as for example a pyridine or a piperidine ring.

The separation and purification of the dyestuffs accordingly can be carried out in per se conventional manner. In the case of a very readily soluble dyestuff, it is often useful to convert it into a difficultly soluble salt, for example, the perchlorate or a heavy metal double salt, particularly into a zinc chloride double salt.

The dyestuffs of the invention are of special interest for dyeing animal and human hair, and particularly for dyeing living human hair.

The dyestuffs have an excellent solubility in media suitable for use in hair dyes, thus more especially in water and water-alcohol mixtures. It is not necessary to use solubilizing agents or dispersers. The drawing capacity and the shade are essentially independent of the pH of the dyeing medium, so that the dyestuffs can be applied by acid, neutral and alkaline dyeing methods. For practical and physiological reasons, a pH value of 3 to 9.5 is best.

As pH-regulating materials, substances which have heretofore been used in the hair cosmetics art can be employed; for example acetic acid, citric acid, tartaric acid and lactic acid, ammonia, alkylamines, polyalkylenepolyamines, alkali metal carbonates, alkaline earth metal hydroxides, etc.

Conventional auxiliary substances can, moreover, be added to the dyestuff solutions, without noticeably impairing the drawing capacity. Such substances comprise, among others, thickening agents, such as polyacrylic acid, methyl-cellulose, bentonite or resins such as polyvinylpyrrolidone; solubilizing agents such as urea; surface active agents, advantageously with cationactive, amphoteric and non-ionogenic character; swelling, emulsifying and dispersing agents; perfume oils and hair treating agents. Depending on practical requirements, the dyestuff solutions are made up in known manner in various forms such as, for example, shampoos, gels, pastes, hair lacquers, hair fixants and sprayable preparations.

In view of the high affinity for hair keratin, the dyestuffs according to the invention are able to dye the hair under physiological conditions. Thus temperatures of below 40° C. and contact times of 5 to 60 minutes, advantageously 15 to 30 minutes, suffice to yield deep dyeings. These dyeings are distinguished by good fastness to washing, fastness to rubbing and fastness to light. Structural differences in the hair such for example as those due to atmospheric and hair cosmetic influences, have essentially no effect on the uniformity of the dyeing. The hair is not injured by the dyeing since no special substances, such as, e.g. peroxides for development of the dye, are necessary. In addition, the skin excellently tolerates the dyes. The dyeings are stable to the reducing agents, such as ammonium thioglycolate, which are used in permanent waving.

An essential advantage of the dyes of this invention is that a range of colors not realizable with the heretofore-employed dyes is made available. This range encompasses deep blue, green and gray shades. Particularly valuable are combinations with other cationic dyes, which make possible the production of dark brown to black natural shades.

The following examples are illustrative of presently preferred embodiments of the invention. Temperatures are in degrees centigrade. Parts are by weight.

EXAMPLE 1

35 parts of 3,7 - bromo - 5 - amino - 8 - hydroxynaphthoquinone-1-imine, 75 parts of 3-aminophenyl-trimethylammonium chloride and 300 parts of glacial acetic acid are heated for 12 hours at 80° C. After diluting the whole with 3000 parts of water, the solution is filtered, and 100 parts of zinc chloride and 300 parts of sodium chloride are added to the filtered solution. The precipitated dyestuff is filtered off and dried. The dyestuff so obtained is thought to correspond to the formula

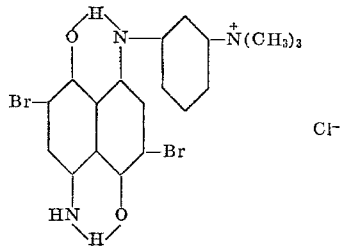

and it dissolves in water with a grey-blue color, in dilute hydrochloric acid with a violet color, and in concentrated sulphuric acid with a brown-violet color.

2 parts of this dyestuff and 2 parts of a nonyl-phenol ethylene oxide addition product are dissolved in 1000 parts of water. After adjusting the pH-value to 9 with triethanolamine, natural grey human hair is dyed with this solution by the following procedure:

(I) After adjusting the pH-value to 9 with triethanolamine, natural grey human hair is treated with the resulting solution for 20 minutes at 30°. After rinsing the hair with water and drying in air, there is obtained a deep grayish blue dyeing which is fast to rubbing and fast to light. If the pH-value is adjusted to 7, substantially the same deep dyeing is obtained.

A solution of 1 part of this dyestuff in 100 parts of water is introduced into a mixture of 60 parts of fatty alcohol ethylene oxide addition product, 30 parts of paraffin oil, 10 parts of petroleum jelly, and 10 parts of fatty alcohol. The resulting paste is applied to bleached hair and allowed to act for 30 minutes at 35° C. A dull blue dyeing is obtained.

By using, instead of the dyestuff of the above formula, a mixture of 1 part of that dyestuff, 1 part of the monoazo-dyestuff obtained from para-phenylene diamine diazotized on one side and 7-trimethylammonio-2-naphthol chloride, and 1 part of the monoazo-dyestuff obtained from ortho-nitro-paraphenylene diamine diazotized on one side and 7 - trimethylammonio - 2 - naphthol chloride, there is obtained a natural effective strong chestnut brown dyeing.

EXAMPLE 2

10 parts of 5 - amino - 8 - hydroxy - 1,4 - naphthoquinone - 1 - imine, 10 parts of 3 - amino - 4 - methylphenyl - triethylammonium chloride and 250 parts of glacial acetic acid are stirred at 90° until ensuing condensation has ended. After dilution with water, the dyestuff is salted out, separated by filtration and dried. The so-obtained dyestuff is thought to correspond to the formula

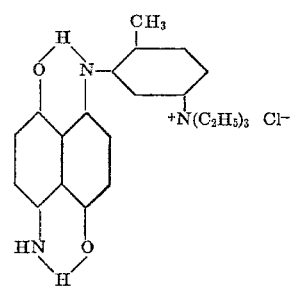

and dissolves in water to yield a greenish blue colored solution, and in concentrated sulfuric acid to yield a brown solution.

0.2 part of this dyestuff and 6 parts of a vinylpyrrolidone-vinyl acetate mixed polymer are dissolved in 40 parts of ethyl alcohol and 54 parts of water. This preparation is applied to natural grey hair and allowed to dry. A washfast bluish dyeing is obtained. If, in this example, the 3 - amino - 4 - methylphenyl - triethylammonium chloride is replaced by an equimolar amount of 4 - amino - 3 - methoxyphenyl- or 3 - amino - 4 - methoxyphenyl-trimethylammonium chloride, a dyestuff with similar coloristic properties is obtained in each case.

EXAMPLE 3

35 parts of 4-amino - 2 - chloro-phenyltrimethylammonium chloride, 40 parts of sodium acetate, 35 parts of 3,7-dibromo-5-amino - 8 - hydroxy-1,4-naphthoquinone-1-imine, 300 parts of isopropanol and 150 parts of water are boiled under reflux until the ensuing reaction is ended. After separation of the alcohol and filtration of the reaction mixture, the dyestuff is precipitated by the addition of salt. The so-obtained dyestuff is thought to correspond to the formula

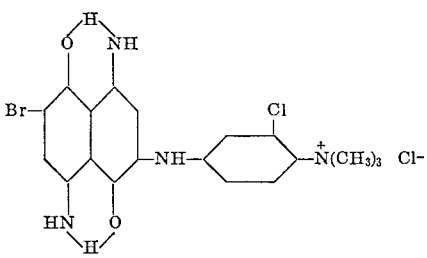

It dissolves in water to yield a dark blue colored solution and dyes hair, when applied as set forth in Example 1, in dark blue shades.

0.3 part of this dyestuff, 1 part of non-ionic wetting agent and 1 part of methylcellulose are admixed with 100 parts of water. The pH-value of the preparation is adjusted to 4.0 with citric acid, poured onto bleached hair and allowed to work on the latter for 30 minutes at 30°. After rinsing and drying the hair, a washfast and rub-fast blue dyeing is obtained.

If the 3,7-dibromo-5-amino-8-hydroxy-1,4-naphthoquinone-1-imine is replaced by the 3,7-dichloro-5-amino-8-hydroxy-1,4-naphthoquinone-1-imine, a dyestuff with substantially the same properties is obtained.

EXAMPLE 4

10 parts of 5-amino-8-hydroxy-1,4-naphthoquinone-1-imine, 45 parts of 3-amino-phenyl-trimethylammonium chloride and 250 parts of glacial acetic acid are heated at 100° until the initial blue-violet solution has turned blue-green. The resultant dyestuff, recovered from the reaction mixture in per se conventional manner, dissolves in water to yield a greenish blue colored solution, and is thought to correspond to the formula

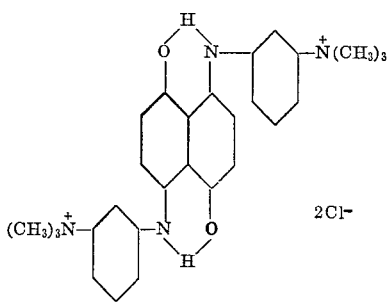

The dyestuff, applied to natural grey hair after the procedure set forth in Example 1, yields a fast, uniform, blue-green dyeing.

EXAMPLE 5

35 parts of 3,7-dibromo-5,8-dihydroxy-1,4-naphthoquinone-1-imine and 77 parts of 3-amino-4-methyl-phenyl-trimethylammonium chloride are condensed after the manner described in Example 1. The resultant dyestuff is thought to correspond to the formula

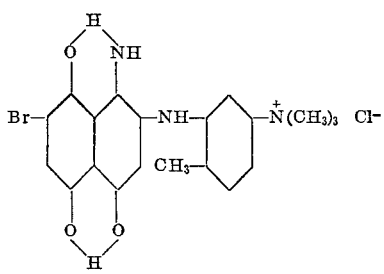

The dyestuff dyes natural grey hair, by the procedure according to the preceding examples, in grey-blue shades.

What is claimed is:

1. A water-soluble cationic naphthoquinoneimine dyestuff prepared by the condensation of one mole of a compound having the formula

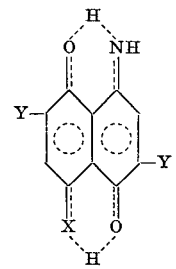

in which X is an oxygen atom or an NH group, Y is a hydrogen atom, a chlorine atom or a bromine atom, with $n$ moles of a compound having the formula

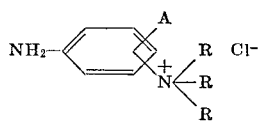

in which $n$ is the number 1 or 2, A is a hydrogen atom, a chlorine atom, a methyl group or a methoxy group, and R is a methyl or an ethyl group, in a solvent at 40–150° C.

2. A water-soluble cationic naphthoquinoneimine dyestuff according to claim 1 wherein the compound of Formula I is 3,7-dibromo-5-amino-1,4-naphthoquinone-1-imine condensed with equimolar amounts of the compound of Formula II, and the solvent is selected from the group consisting of acetic acid, ethanol, isopropanol, dimethylformamide and water.

3. A water-soluble cationic naphthoquinoneimine dyestuff according to claim 1 wherein the compound of Formula I is 3,7-dibromo-5-amino-1,4-naphthoquinone-1-imine and the compound of Formula II is 3-aminophenyltrimethylamonnium chloride and the solvent is selected from the group consisting of acetic acid, ethanol, isopropanol, dimethylformamide and water.

4. A water-soluble cationic naphthoquinoneimine dyestuff according to claim 1 wherein the compound of Formula I is 3,7-dibromo-5-amino-1,4-naphthoquinone-1-imine and the compound according to Formula II is 4-amino-2-chlorophenyltrimethylammonium chloride, said compounds being reacted in equimolar amounts in a solvent selected from the group consisting of acetic acid, ethanol, isopropanol, dimethylformamide and water.

References Cited

UNITED STATES PATENTS 2,555,973  6/1951  Kartaschoff et al. ____ 260—396
3,422,111  1/1969  Bossard et al. _____ 260—396

LORRAINE A. WEINBERGER, Primary Examiner

L. A. THAXTON, Assistant Examiner

U.S. Cl. X.R.

8—10.1; 260—294.7 A, 296 R